US011559757B2

(12) United States Patent
Ruzicka (10) Patent No.: US 11,559,757 B2
(45) Date of Patent: Jan. 24, 2023

(54) WATER FILTRATION APPARATUS (71) Applicant: Marclara, LLC, Camrose (CA)

(72) Inventor: Patrick Ruzicka, Killam (CA)

(*) Notice: Subject to any disclaimer, the term of this patent is extended or adjusted under 35 U.S.C. 154(b) by 104 days.

(21) Appl. No.: 16/807,083

(22) Filed: Mar. 2, 2020

(65) Prior Publication Data
US 2021/0268409 A1 Sep. 2, 2021

(51) Int. Cl.
*B01D 29/17* (2006.01)
*B01D 35/30* (2006.01)

(52) U.S. Cl.
CPC ............ *B01D 29/17* (2013.01); *B01D 35/30* (2013.01); *B01D 2201/0446* (2013.01); *B01D 2201/0461* (2013.01)

(58) Field of Classification Search
CPC ................... B01D 29/17; B01D 2201/0446
See application file for complete search history.

(56) References Cited

U.S. PATENT DOCUMENTS

| | | | | |
|---|---|---|---|---|
| 2,570,132 A * | 10/1951 | Koupal | ............... | B01D 29/114 210/323.1 |
| 3,416,669 A * | 12/1968 | Hubbard | ............... | B01D 35/16 210/333.1 |
| 3,666,097 A * | 5/1972 | Ryan | ................ | B01D 29/661 210/333.01 |
| 4,163,724 A * | 8/1979 | Muller | ................ | B01D 29/52 210/334 |
| 4,293,414 A * | 10/1981 | Gianneli | ............. | B01D 36/001 210/193 |
| 5,409,515 A * | 4/1995 | Yamamoto | ......... | B01D 46/2407 55/382 |
| 5,766,486 A | 6/1998 | Cathcart | | |
| 5,891,333 A | 4/1999 | Ferguson | | |
| 6,440,188 B1 | 8/2002 | Clements et al. | | |
| 6,676,722 B1 | 1/2004 | Clements et al. | | |
| 6,702,941 B1 | 3/2004 | Haq et al. | | |
| 6,932,907 B2 | 8/2005 | Haq et al. | | |
| 8,876,168 B2 | 11/2014 | Pompeii | | |
| 8,888,884 B2 | 11/2014 | Mann et al. | | |
| 9,302,205 B1 * | 4/2016 | Nehlen, III | .......... | B01D 29/018 |
| 10,406,458 B1 * | 9/2019 | Nehlen, III | ............ | B01D 29/15 |
| 2012/0324845 A1 | 12/2012 | Doehla et al. | | |
| 2018/0003449 A1 | 1/2018 | Little et al. | | |

FOREIGN PATENT DOCUMENTS

WO 2019183611 9/2019

* cited by examiner

*Primary Examiner* — Benjamin M Kurtz
(74) *Attorney, Agent, or Firm* — John J. Bamert, Esq.; Bamert Regan PLLC (57) ABSTRACT

Aspects of the present disclosure relate to an apparatus for filtering a fluid. One exemplary aspect including a casing having an interior cavity and extending between a fluid inlet and a fluid outlet at opposed ends thereof, a tube sheet assembly spanning the interior cavity the tube sheet assembly having a plurality bores therethrough and a plurality of filter media tubes each extending from one of the plurality of bores in the tube sheet assembly. In some exemplary aspects, the tube sheet assembly may comprise a plurality of retaining plates sandwiched together with a tube sheet plate. In some exemplary aspects, the apparatus may further comprise at least one restrictor plate adapted to obstruct at least one of the plurality of bores of the tube sheet.

25 Claims, 8 Drawing Sheets

WATER FILTRATION APPARATUS

BACKGROUND

1. Technical Field

This disclosure relates generally to filtration systems and in particular to an apparatus and system for filtering water with improved serviceability.

2. Description of Related Art

In many industries, it is necessary to filter or otherwise clean a liquid from contaminants and particles. In particular, water is a commonly filtered fluid for use in swimming pools and the like. Conventionally, for use with swimming pools and related industries, the water would be passed through a plurality of filter media tubes contained within an outer shell. Such filter types are commonly referred to as a regenerative media filter. Several disadvantages with present regenerative media filters currently exist.

In particular, current regenerative media filters include a removable tube sheet having the tube filter media suspended therefrom. Such tube sheets are expensive to manufacture due to the size of such devices. In particular, the tube sheets are commonly formed of a relatively thick gauge of material to provide the necessary strength and the holes therein formed by drilling. It will be appreciated that such drilling steps are time consuming and expensive.

Figure 1:
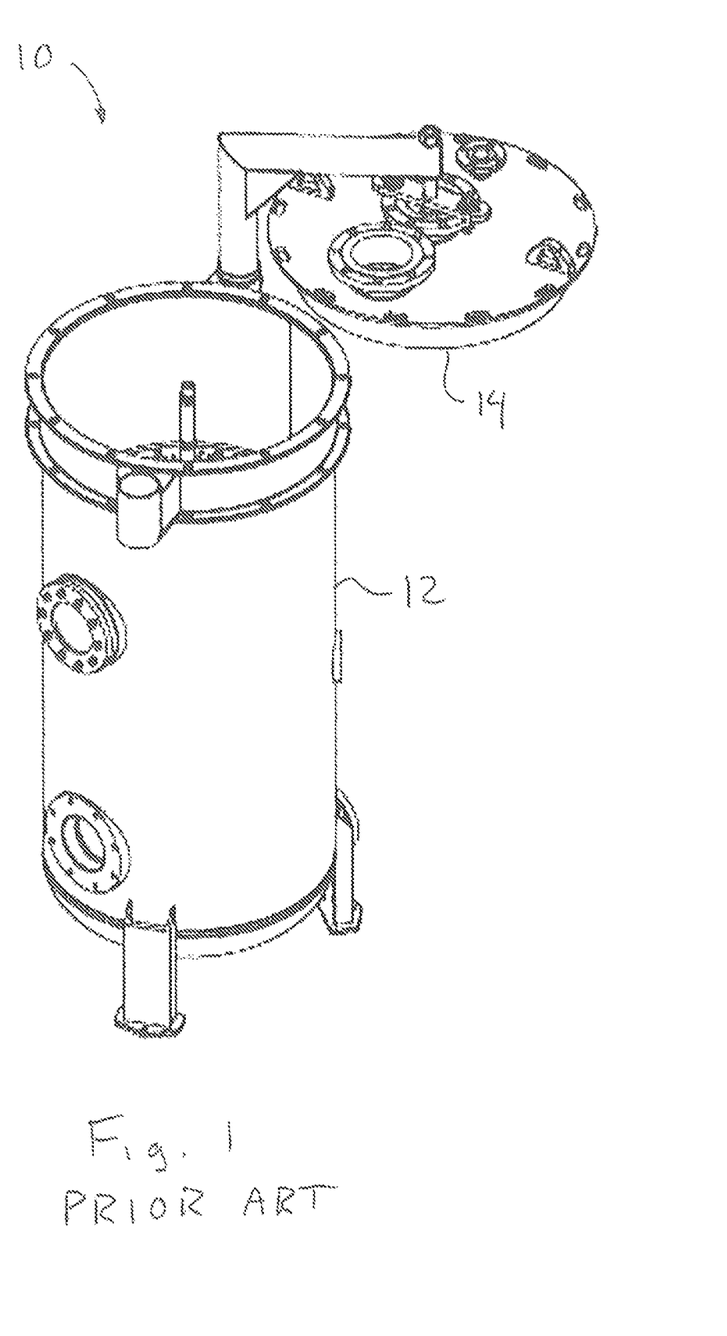
FIG. 1 is a perspective view of a prior art regenerative media filter.

In addition, with reference to FIG. 1, the casing of conventional regenerative media filters 10 are formed of a main body 12 and a bolted or otherwise removable lid 14. Such lids 14 are commonly rotated to the side of the body 12 to permit access to the tube sheets and internal components for servicing. In particular it may sometimes be necessary to remove the tube sheets and tubes for servicing and repair necessitating such removable lid. Disadvantageously, such removable lids add space requirements to the regenerative media filter devices so as.

Furthermore, the size of the regenerative media filter is dependent upon the surface area provided by the tubes. In particular, by the quantity, size and length of such tubes. It will be appreciated that to vary or alter the size of such devices, it is therefore commonly necessary to replace the tube sheets and/or tubes to change the filtration surface area thereof. Such modification may only conventionally be achieved by removing the lid as set out above to also then remove and replace the tube sheets and/or tubes. Disadvantageously, this difficulty has resulted in different discrete sizes of regenerative media filters for different applications.

SUMMARY

According to a first embodiment, there is disclosed an apparatus filtering a fluid comprising a casing having an interior cavity and extending between a fluid inlet and a fluid outlet at opposed ends thereof, a tube sheet assembly spanning the interior cavity the tube sheet assembly having a plurality bores therethrough and a plurality of filter media tubes each extending from one of the plurality of bores in the tube sheet assembly.

The tube sheet assembly may comprise a plurality of retaining plates sandwiched together with a tube sheet. The tube sheet and the retaining plates may be bolted together. The retaining plates may each comprise a plurality of segments arranged along a common plane with each other to form a common retaining plate. The segments may comprise radial segments forming a common circular retaining plate.

The apparatus may further comprise support braces extending along connecting edges of the tube sheet segments. The radial segments may each form a radial angle between 30 and 90 degrees.

The casing may comprise a unitary construction having a permanently connected top portion. The top portion may include at least one access port therethrough into the interior cavity. The at least one access port may be sized to permit elements forming the tube sheet assembly to be passed therethrough.

The apparatus may further comprise at least one restrictor plate adapted to obstruct at least one of the plurality of bores of the tube sheet. The at least one restrictor plate may comprise one of a plurality of configurations wherein each configuration obstructs a unique number of bores in the tube sheet. The plurality of restrictor plates may have an outline corresponding to radial segments forming the tube sheet.

The apparatus may further include a suspension rod extending from the top portion of casing to the tube sheet assembly for supporting the tube sheet assembly. The interior cavity may include a downwardly oriented shelf. The tube sheet assembly may be drawn upwards into engagement with the downwardly oriented shelf.

The apparatus may further include an actuator operable to draw the suspension rod in an upward direction so as to engage the tube sheet assembly on the downwardly oriented shelf. The suspension rod and the tube sheet assembly may be rotatable about a vertical axis. The casing may include a rotary seal surrounding the suspension rod.

The rotary seal may comprise a bushing sealably surrounding the suspension rod and a bushing support sleeve supported by a top portion of the casing. The bushing support sleeve may comprise a unitary tubular member having a cylindrical shell and a bottom shoulder wherein the bushing is received within the cylindrical shell and supported by the bottom shoulder. The apparatus may further comprise a seal between the bushing and the bottom shoulder.

The actuator may comprise an air spring assembly connected to a top end of the bushing support sleeve and a top end of the suspension rod. The bushing may extend to a bushing retaining plate between the bushing and the air spring assembly. The apparatus may further comprise at least one shim between the bushing and the air spring assembly.

Other aspects and features of the present disclosure will become apparent to those ordinarily skilled in the art upon review of the following description of specific embodiments in conjunction with the accompanying figures.

BRIEF DESCRIPTION OF THE DRAWINGS

The accompanying drawings constitute part of the disclosure. Each drawing illustrated exemplary aspects of this disclosure that, together with the written description explain the principles described herein.

DETAILED DESCRIPTION

Figure 2:
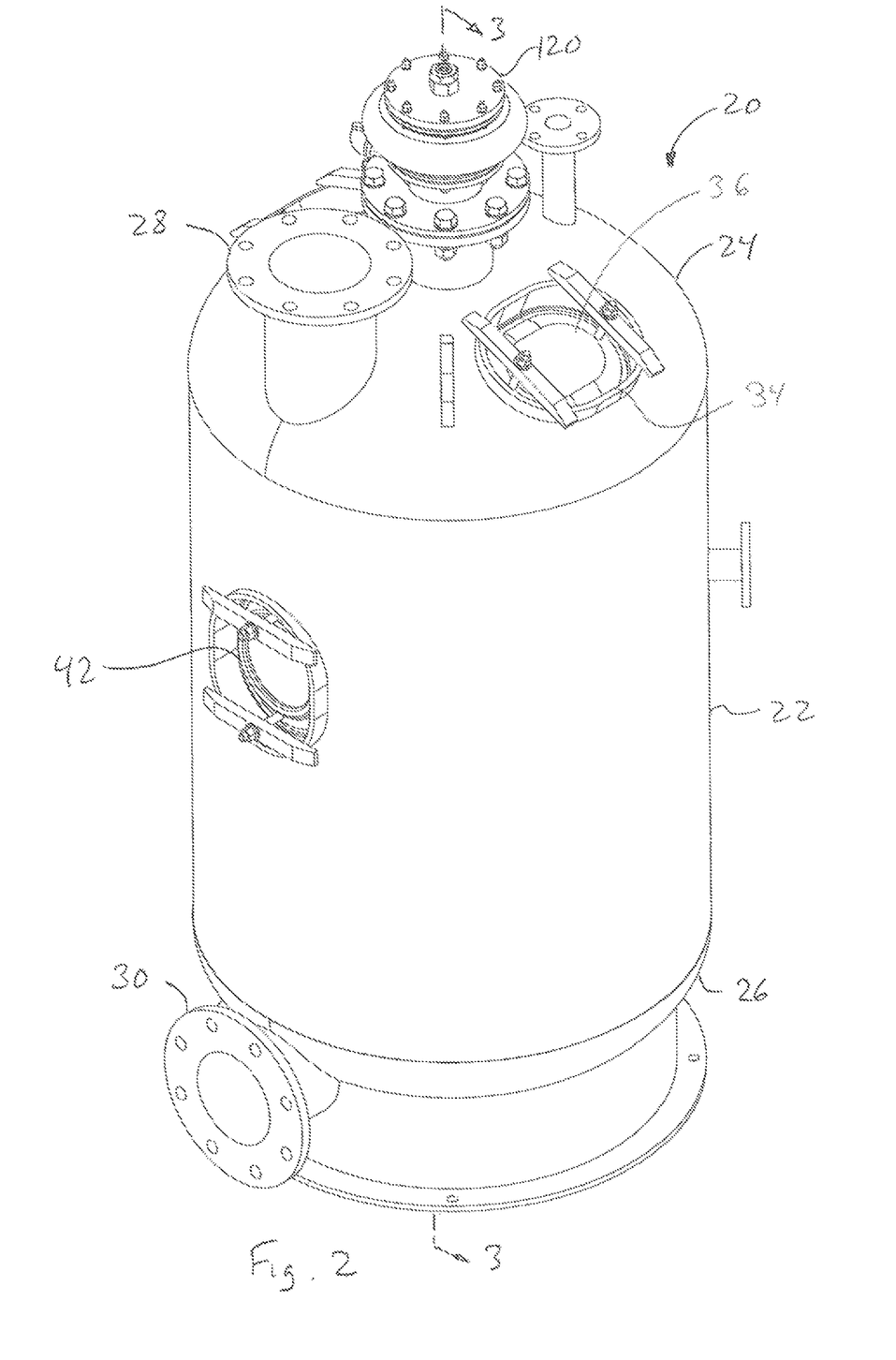
FIG. 2 is a perspective view of an exemplary water filtration apparatus in accordance with the present disclosure.
Figure 3:
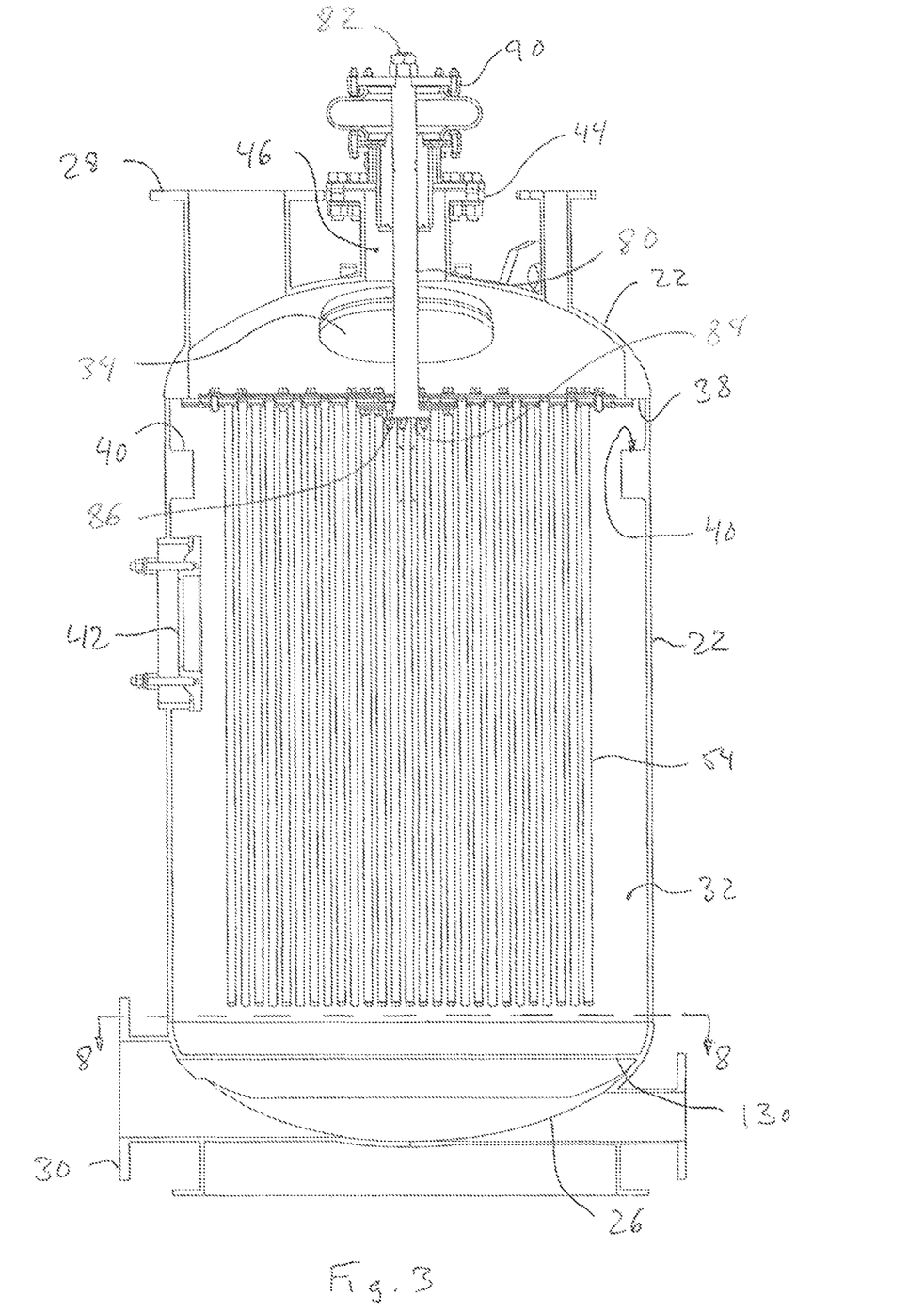
FIG. 3 is a cross sectional view of the apparatus of FIG. 2 as taken along the line 3-3.

Aspects of the present disclosure are now described with reference to exemplary apparatus, method and systems. Referring to FIGS. 2 and 3, an exemplary apparatus for filtering fluid, such as, by way of non-limiting example, water according to a first embodiment of the invention is shown generally at 20. The apparatus comprises a casing 22 including a tube sheet assembly 50 suspending a plurality of filtration tubes 54.

The casing 22 comprises a unitary body extending between top and bottom ends, 24 and 26, respectively. The top end 24 include a water outlet 28 and the bottom end 26 includes a water inlet 30. The water outlets and inlets 28 and 30 may be of any conventional type such as, by way of non-limiting example, flanged, threaded, welded or coupled so as to transmit water into and out of the interior of the casing for filtration as will be set out more fully below. The casing 22 forms an interior cavity therein as illustrated in FIG. 3. The casing body 22 may be formed by any conventional means, including welding, cast or moulded. The casing body 22 may also be formed of any suitable material, such as, by way of non-limiting example, steel, stainless steel, aluminium, fibre reinforced plastics or plastic.

The top end 24 of the casing body includes at least one access port 34 extending into the cavity 32. The access port 34 includes a door 36 or other suitable closable body for selectably sealing or providing access through the access port into the cavity 32. The access ports 34 define an opening having a shape and sized adapted to pass the interior components forming the filtering apparatus contained within the cavity 32 as will be further described below. Although the access ports 34 are illustrated on the top end 24 of the casing 22, it will be appreciated that they may be located at other locations in the casing 22 so as to provide access to the filter media components as well.

As illustrated in FIG. 3, the cavity 32 may include a downwardly oriented shelf 38 proximate to the top end 24 forming a surface oriented towards the bottom end 26. As will be further set out below, the tube sheet assembly 50 is drawn upward against the downwardly oriented shelf 38 to seal it against the casing 22 as is commonly known. As will be described below, the tube sheet assembly may have a generally circular outer profile and be rotatable within the casing 22. With reference to FIG. 2, the casing 22 may have a substantially circular cross section so as to permit the filter media contained therein to be rotated as will be further described below. In particular, although the casing 22 may be of non-circular shapes, the downwardly oriented shelf 38 may be substantially circular so as to permit engagement with the tube sheet assembly 50 as set out above. Optionally, the casing 22 may include one or more supports 40 extending from the wall of the casing below the downwardly oriented shelf 38. The supports 40 are positioned and extend from the wall of the casing by a distance sufficient to receive the tube sheet assembly 50 thereon at a lowered position.

The casing 22 may optionally include one or more viewing windows 42 extending through the casing 22 so as to provide viewing access thereinto. The top end 24 additionally includes an extension 46 extending from the cavity 32 to a top flange 44. The top flange 44 and extension 46 are substantially axially centred along an axis of the casing 22 and are adapted to pass a support rod 80 from the tube sheet assembly 50 to the top support assembly as will be more fully described below.

Figure 4:
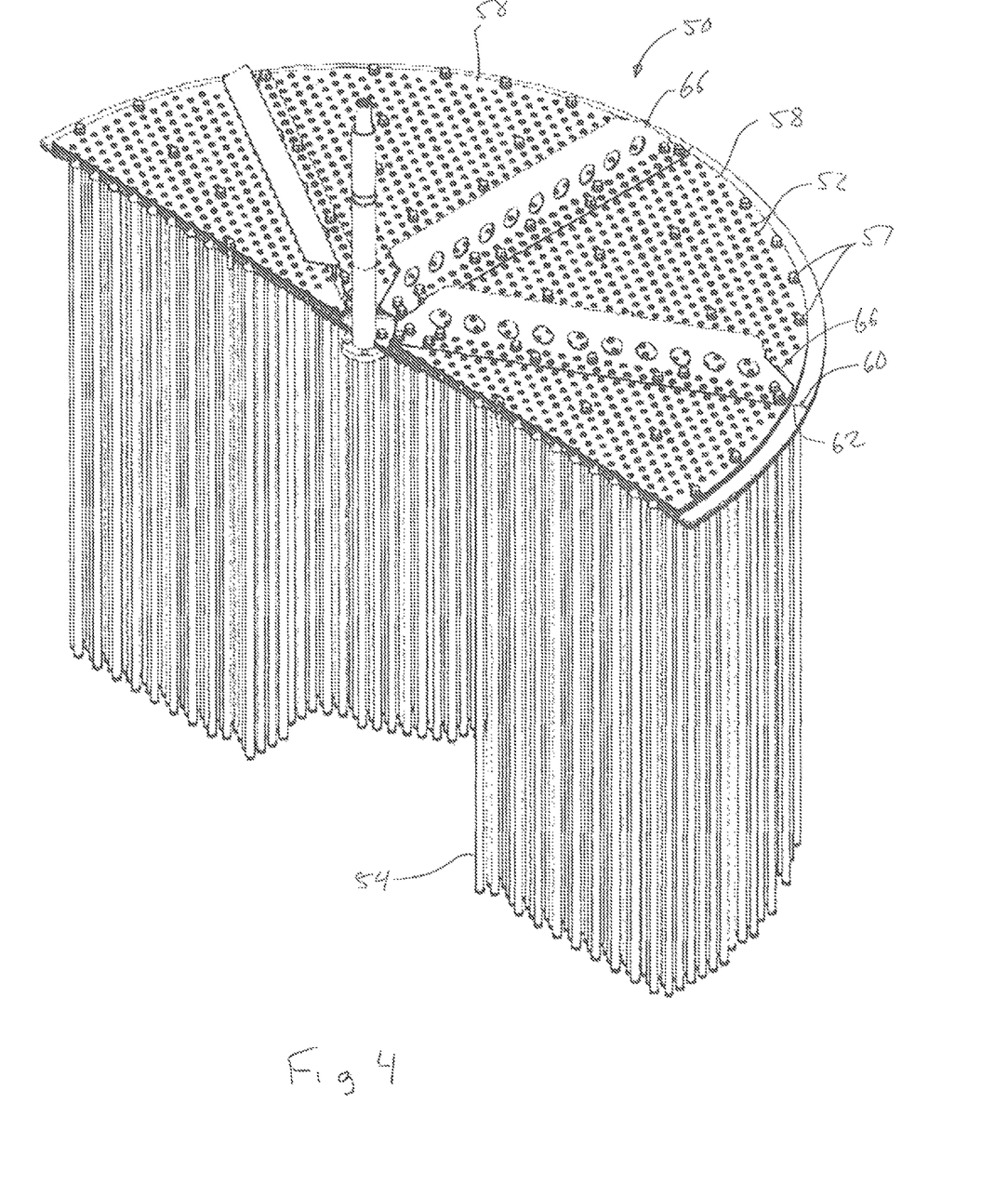
FIG. 4 is a partial perspective view of the tube sheet assembly of the apparatus of FIG. 2.
Figure 5:
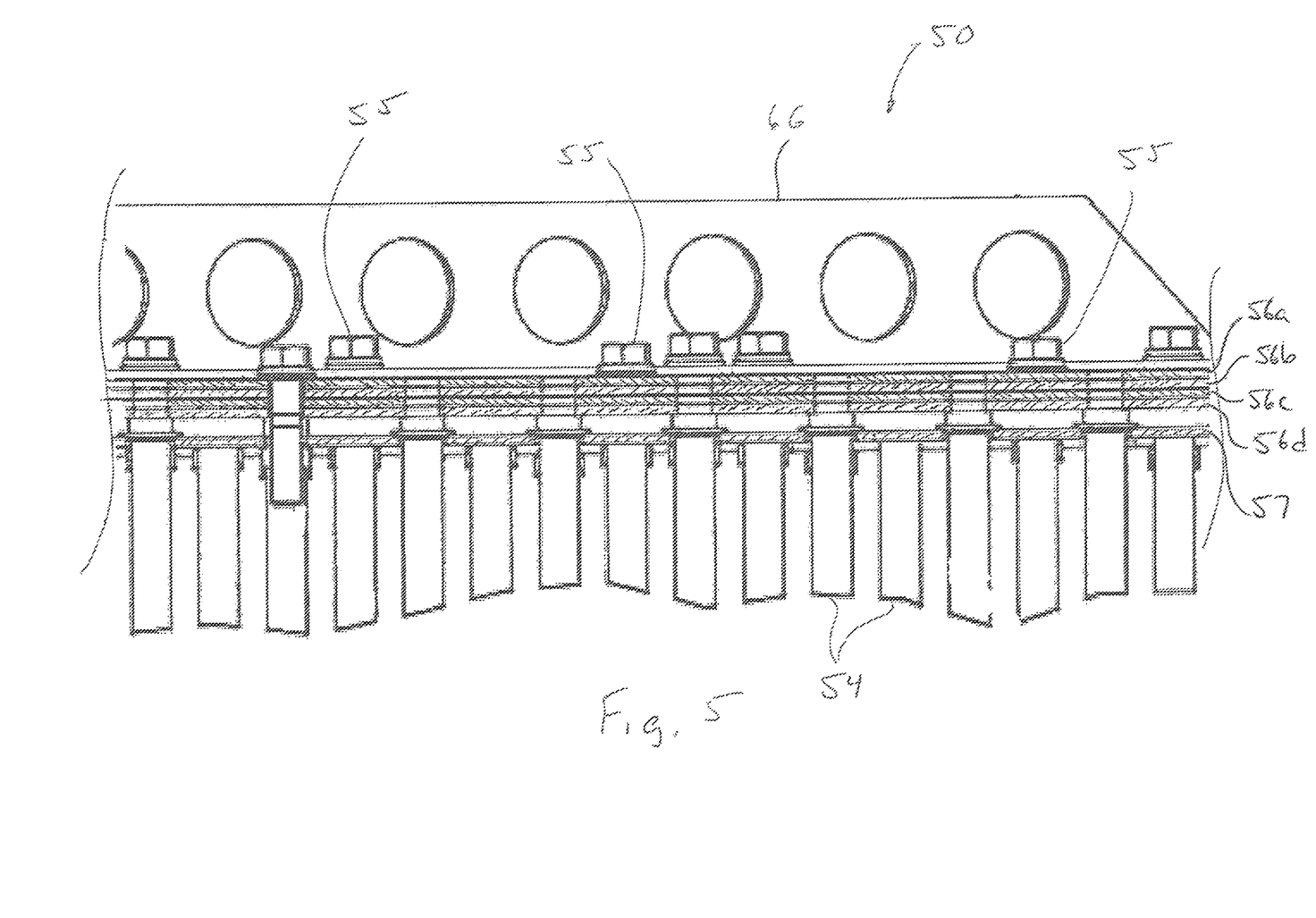
FIG. 5 is a partial cross-sectional view of the tube sheet assembly of the apparatus of FIG. 2.

Turning now to FIG. 4, a portion of the tube sheet assembly 50 is illustrated. The tube sheet assembly 50 includes a plurality of bores 52 extending therethrough each aligned with one of a plurality of filter tubes 54 as are commonly known. With reference to FIG. 5, the tube sheet assembly 50 is formed of a plurality of retaining plates 56a, 56b, 56c and 56d and a tube sheet plate 57 are stacked or otherwise sandwiched together to form a common tube sheet assembly 50. A gasket 59 shown in FIG. 6 may also be included above the tube sheet plate 57 and retaining plates 56a through 56d. The bores 52 on each of the retaining plates 56a through 56d are aligned with the bores on the tube sheet plate 57 to as to form a continuous bore through the tube sheet assembly 50 to the tubes 54. In particular, the tubes 54 may be passed through the tube sheet plate 57 and the retaining plates 56a-56d stacked thereover. Although the present illustration in FIG. 5 includes 4 retaining plates 56a through 56d, it will be appreciated that other quantities may be useful as well depending on the strength requirements of the tube sheet assembly 50. Bolts 55 or other fasteners may be passed through the tube sheet plates 57 and retaining plates 56a through 56d to retain them together thereby forming a common structural tube sheet assembly 50. By reinforcing the tube sheet plate 57 with individual retaining plates, such tube sheet plates may be selected of thinner material. By way of non-limiting example, the tube sheet plates may be selected to have a thickness of between ¼ inch (6 mm) and 16 gauge has been useful. The use of thinner individual tube sheet plate and also permits the bores 52 to be formed therein by punching rather than being required to be drilled. It will be appreciated that this will in turn reduce the time required to form such tube sheet plates.

As illustrated in FIG. 4, each retaining plate 56a through 56d may be formed of segments 58. Each segment 58 corresponds to a portion of the circular tube sheet 57 so form a complete circular outline of the tube sheet assembly 50 when thus connected together along a common plane. In particular each segment 58 may comprise a pie shape formed between first and second sides, 60 and 62, respectively. The angle between the first and second sides, as generally indicated at 64 may be selected such that a desired number of segments 58 from the complete circular tube sheet 50. By way of non-limiting example, the angle 64 may be selected to be 30, 45, 60 or 90 degrees although it will be appreciated that other angles may also be utilized and uneven angles may be combined as desired by a user. The angle 64 selected permits the tube sheet assembly to be formed of segments that may be individually removed through the access ports 34 for service and replacement. In operation, the segments 58 are arranged radially side by side such that a first edge 60 of one segments abuts a second edge 62 of an adjacent segment. The connection between segments may optionally be spanned by a brace member 66 spanning over a portion of each of the abutting segments 58 and bolted thereto so as to provide a coupling force to each as well as to provide rigidity to the connected structure. It will be appreciated that such brace members 66 may not be required for smaller tube sheet assemblies 50.

Figure 6:
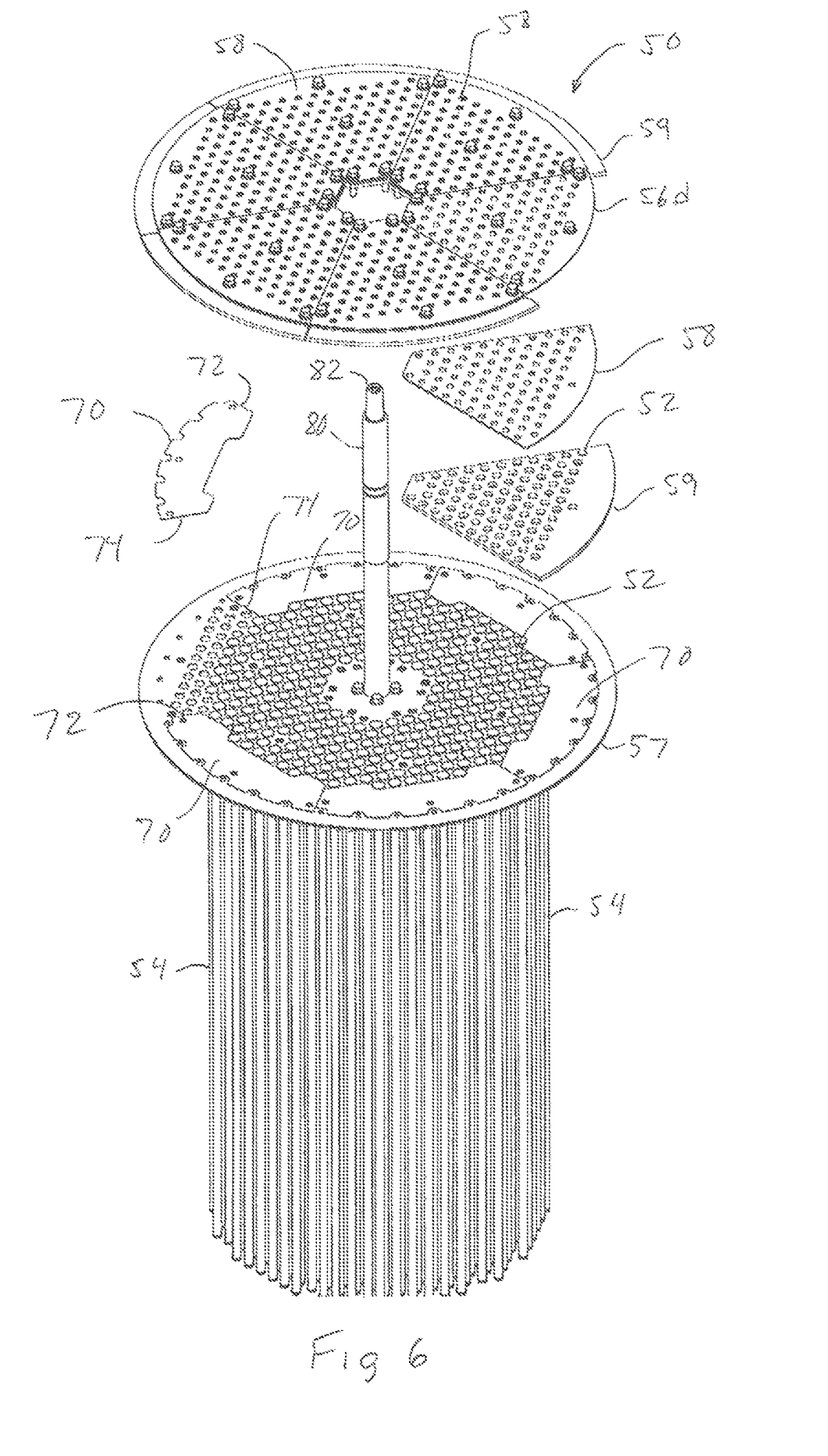
FIG. 6 is an exploded perspective view of the assembly of the tube sheet plate and restrictor plates of the apparatus of FIG. 2.

As illustrated in FIG. 6, the tube sheet assembly 50 may also include one or more restrictor plates 70 incorporated into the sandwich structure between the tube sheet 57 and the first retaining plates 56d. In particular, the restrictor plates 70 may be included in the sandwich structure above the tube sheet plate 57 and before the first retaining plate 56d. The restrictor plates 70 comprise a solid plate having an outline adapted to obstruct one or more of the bores 52 so as to reduce the effective filtration area of the tube sheet assembly 50 by isolating the utilized tubes 54 to those tubes having corresponding bores 52 not blocked by the restrictor plates. As illustrated, the restrictor plates may have outlines extending between first and second edges 72 and 74 corresponding to the angular width of the segments 58. The restrictor plates 70 are illustrated as extending from the peripheral edge of the segments in FIG. 6 although it will be appreciated that they may be designed to obstruct other locations in the tube sheet assembly 50 as well. Furthermore, although the restrictor plates are shown as being solid so as to obstruct all bores 52 within their perimeter, it will be appreciated that openings or bores through the tube sheet plate 57 may also be included so as to leave one or more bores 52 within their perimeter unobstructed and therefore in operation. In use, the restrictor plates 70 may be interchanged in the tube sheet assembly 50 to vary the filtration capacity of the apparatus 20 by reducing or adding utilized tubes 54. It will be appreciated that the use of such restrictor plates 70 thereby permits the use of a single casing 22 to provide different sizes of filtration without the need to replace the casing and without the need to replace the installed tube sheet plate 57. Such adaptability also permits the size capacity of the apparatus 20 to be adapted or modified after installation by adding or removing restrictor plates 70.

The tube sheet assembly 50 is suspended from a support rod 80 passing through the tube sheet assembly and up through the top of the casing 22 to a support assembly 90. The support rod 80 extends between top and bottom ends, 82 and 84 respectively and includes a support flange 86 at the bottom end 84 thereof for supporting at least a portion of the tube sheet assembly 50 thereon. The top end 82 includes a fastener 88 for connection for the support assembly as will be further set out below.

Figure 7:
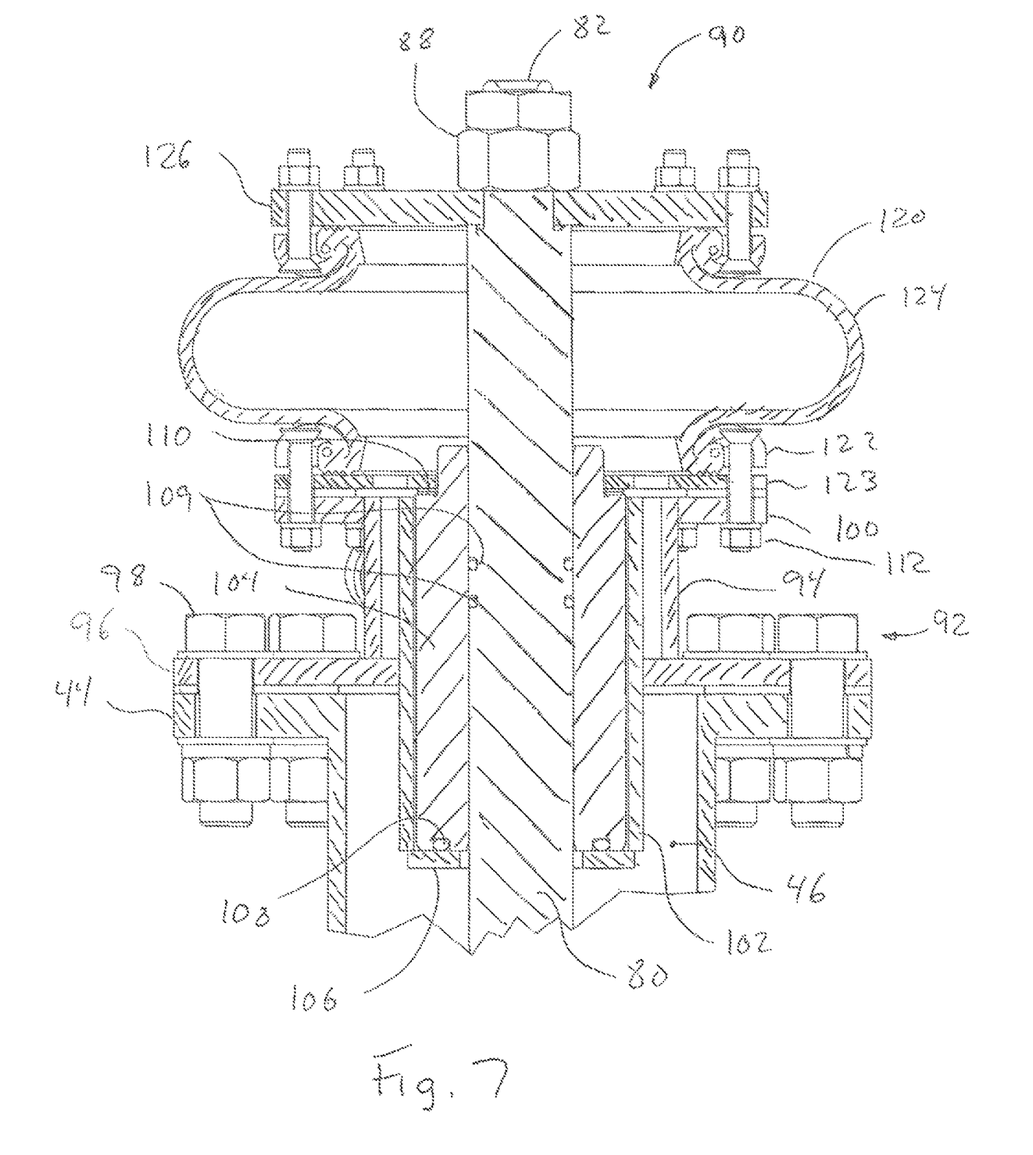
FIG. 7 is a cross-sectional view of the actuator and bearing assembly of the apparatus of FIG. 2.

Turning now to FIG. 7, the support assembly 90 is secured to the top flange 44 of the casing 22. The support assembly 90 comprises a body adapted to support the top end 82 of the support rod 80 and draw the support rod and tube sheet assembly 50 up until the tube sheet assembly is in contact with the downwardly oriented shelf 38. The support assembly 90 includes a bearing assembly 92 with an actuator 120 thereabove. The bearing assembly 92 comprises an outer body 94 having a bottom flange 96 connectable to the top flange 44 and a top flange 100. The bearing assembly further includes a tubular sleeve 102 supported by the outer body 94 having an inner surface sized to receive a bushing 104 or bearing therein. The tubular sleeve 102 extends to an inner flange 106 at a bottom end thereof. The bearing assembly 92 may include at least one seal 108 between a bottom end of the bushing and the inner flange 106 and at least one seal 109 between the bushing 104 and the support rod 80 to prevent water leaking past the bushing assembly while permitting rotation of the support rod 80 and tube sheet assembly 50 relative to the casing 22. The bushing may be of any suitable type, such as, by way of non-limiting example, PolyOxyM-ethylene and other polymer bushings that can be made sufficiently smooth to seal with the O-rings and do not react or corrode.

The actuator 120 may be of a pneumatic design such as, by way of non-limiting example, a Firestone™ air spring as are commonly known. In particular the actuator 120 may comprise a selectably fillable pneumatic or inflatable bladder 124 formed between a bottom flange 122 and a top plate 126. The top plate 126 passes the support rod 80 therethrough and is secured thereto with the fastener 88 and a seal. The bottom flange 122 is secured to the top flange 100 of the bearing assembly 92 with fasteners 112 with a bushing retaining plate 123 therebetween. As illustrated, the bushing retaining plate 123 may engage upon an outer annular portion of the bushing 104 so as to provide a biasing force onto the bushing improving contact with the seal 108. One or more shims 110 may be provided between the bushing retaining plate 123 and the bushing if required to ensure proper a seal between the bushing 104 and the inner flange 106. Providing the shims 110 only around the outer annular portion of the bushing with a central portion of the bushing passing through the bushing retaining plate 123 aids in locating the shims in the correct location.

In operation, when activated by a user, the bladder 124 will be inflated lifting the support rod 80 and the tube sheet assembly 50 until the tube sheet assembly is in engagement with the downwardly oriented shelf 38. When a user desires to service or provide other operations on the tube sheet assembly, the bladder 124 may be partially or fully deflated lowering the support rod 80 and tube sheet onto the supports 40. Thereafter, the tube sheet assembly 50 may be rotated and serviced through the ports 34 or individual segments 58, tubes 54, braces 66 or any other components removed from the cavity 32. The tube sheet assembly 50 may also be rotated to facilitate such servicing or maintenance.

Figure 8:
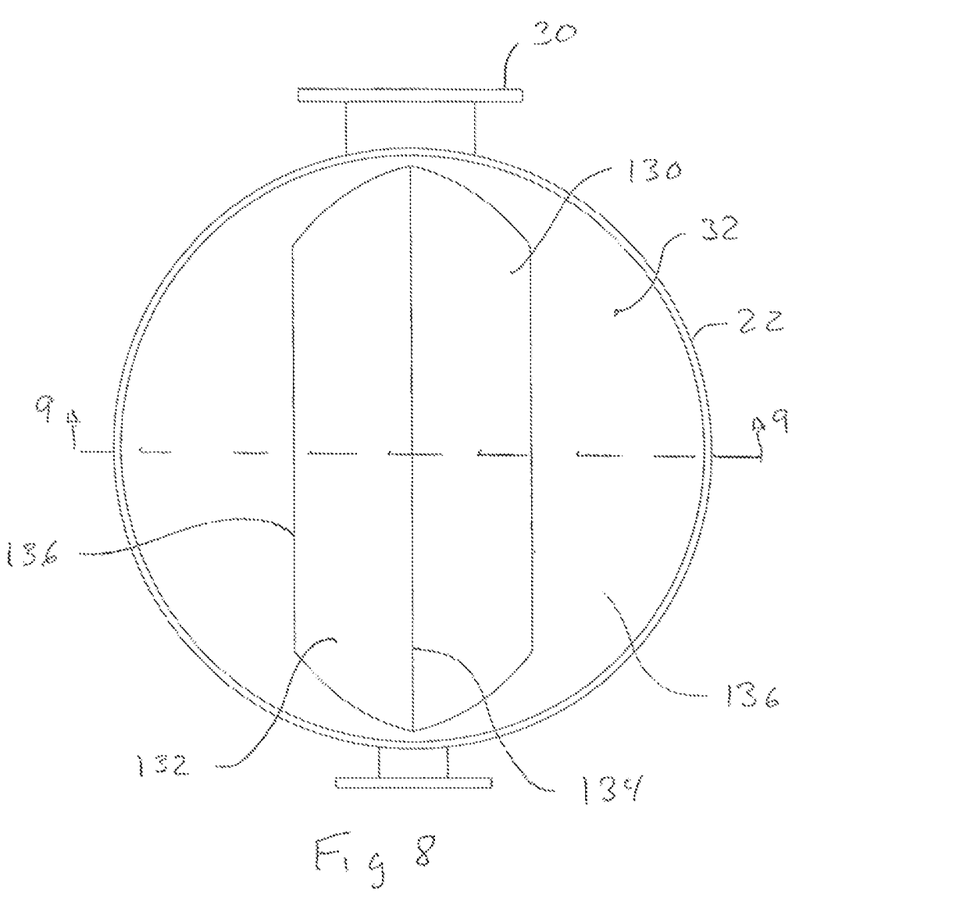
FIG. 8 is a cross-sectional view of the apparatus of FIG. 2 as taken along the line 8-8 of FIG. 3.
Figure 9:
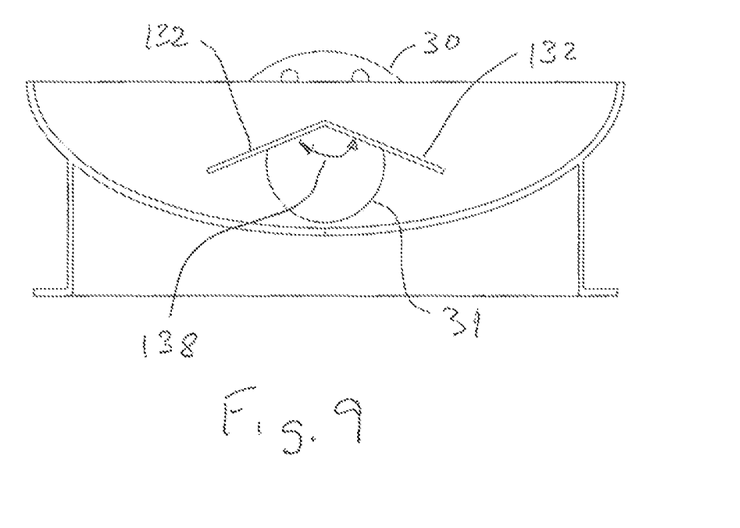
FIG. 9 is a cross-sectional view of the apparatus of FIG. 2 as taken along the line 9-9 of FIG. 7.

Turning now to FIGS. 8 and 9, the bottom end 26 of the casing 22 includes a diffuser 130 spanning the cavity 32 thereof at a location above the inlet 30. The diffuser 130 serves to provide an even flow of water across the cross section of the cavity 32. In particular, the diffuser 130 as utilized in the present disclosure comprises a pair of angled diffuser plates 132 connected together along a midline 134 of the casing 22. The plates 132 extend to free distal edges 136 and form peak angle 138 therebetween as illustrated in FIG. 9. The peak angle 138 assists with the directing residual solids off of the plates 132 and may be selected to be between 90 and 180 degrees As shown in FIG. 9, the plates 132 are located above an opening 31 of the inlet 30 so as to direct all flow of water from the inlet 30 to the full width of the cavity and to each side. The plates extend to and are formed connected to the casing 22 as shown in FIG. 8 and may be formed of the same material as the casing and may co-formed therewith or connected thereto through any known means such as, by way of non-limiting example, welding, fasteners, adhesives or the like.

While specific embodiments of the disclosure have been described and illustrated, such embodiments should be considered illustrative only and not as limiting the disclosure as construed in accordance with the accompanying claims.

What is claimed is:

1. An apparatus for filtering a fluid, the apparatus comprising:
a casing defining an interior cavity, an access port offset from a center of a top of the casing and having a smaller diameter than said interior cavity, a fluid inlet configured to direct the fluid into said interior cavity, and a fluid outlet configured to direct the fluid out of said interior cavity;

a tube sheet assembly spanning said interior cavity, said tube sheet assembly having a plurality of segments, the segments being separable from the tube sheet assembly, the segments being coplanar with each other when installed in said interior cavity and thereby defining a common retaining plate, each one of the segments being accessible through the access port and being sized and dimensioned to be installed through the access port into said interior cavity and removed through the access port from said interior cavity, each one of the segments defining a plurality of bores therethrough, whereby the access port and the segments facilitate reducing a dimension of a space required for installation of the apparatus;

a plurality of filter media tubes, each filter media tube in the plurality of filter media tubes extending from a respective one of said plurality of bores; and a plurality of restrictor plates, each of the restrictor plates having a perimeter shape that is smaller than a perimeter shape of the tube sheet assembly, each of the restrictor plates being selectively couplable to said tube sheet assembly and adapted to simultaneously sealably obstruct multiple ones of the bores when coupled to said tube sheet assembly, said tube sheet assembly having a tube sheet plate disposed opposite the restrictor plates from one of the segments, whereby the restrictor plates facilitate installation of the apparatus in different environments that utilize different size filters.

2. The apparatus of claim 1 wherein each of the segments has a perimeter that defines a radial angle between 30 and 90 degrees when installed in the tube sheet assembly.

3. The apparatus of claim 1 wherein said casing comprises a unitary construction having a permanently connected top portion.

4. The apparatus of claim 1 wherein each of the restrictor plates is configured to be installed in the tube sheet assembly in a plurality of installation configurations, wherein each of the installation configurations causes each of the restrictor plates to sealably obstruct a unique number of the bores.

5. The apparatus of claim 1 wherein each of the restrictor plates has a perimeter that corresponds to a segment in the plurality of segments forming said tube sheet assembly.

6. The apparatus of claim 1 further comprising a suspension rod extending from a top portion of the casing to said tube sheet assembly for supporting said tube sheet assembly.

7. The apparatus of claim 6 wherein said suspension rod and said tube sheet assembly are rotatable about a vertical axis.

8. The apparatus of claim 6 wherein said interior cavity includes a downwardly oriented shelf, and said tube sheet assembly is drawn upwards into engagement with said downwardly oriented shelf.

9. The apparatus of claim 8 further comprising an actuator operable to draw said suspension rod in an upward direction so as to engage said tube sheet assembly on said downwardly oriented shelf.

10. The apparatus of claim 9 further comprising a rotary seal surrounding said suspension rod, a bushing sealably interfacing with the rotary seal, and a bushing support sleeve supported by a top portion of said casing.

11. The apparatus of claim 10 wherein said bushing support sleeve comprises a unitary tubular member having a cylindrical shell and a bottom shoulder wherein said bushing is received within said cylindrical shell and supported by said bottom shoulder.

12. The apparatus of claim 10 wherein said actuator comprises an air spring assembly connected to a top end of said bushing support sleeve and a top end of said suspension rod.

13. The apparatus of claim 12 wherein said bushing extends to a bushing retaining plate between said bushing and said air spring assembly.

14. The apparatus of claim 13 further comprising a bottom seal and at least one shim between said bushing and said air spring assembly, the bottom seal being disposed between a bottom end of the bushing and a bottom shoulder of the bushing support sleeve and extending around the suspension rod, the at least one shim urging the busing toward the bottom shoulder of the bushing support sleeve and thereby compressing the bottom seal.

15. The apparatus of claim 1 wherein the tube sheet assembly is disposed between the access port and said inlet, and the access port has a central axis that is non-parallel to the filter media tubes when the filter media tubes extend from said bores.

16. The apparatus of claim 1 wherein the restrictor plate is non-porous except for one or more fastener holes configured to receive fasteners.

17. The apparatus of claim 1, further comprising a diffuser plate that spans said interior cavity and that is disposed between the filter media tubes and the inlet.

18. The apparatus of claim 17 wherein the filter media tubes extend from said tube sheet assembly toward the inlet, and the diffuser plate is solid throughout its entirety.

19. The apparatus of claim 17, further comprising another diffuser plate, the diffuser plate and the other diffuser plate sloping downwardly away from each other.

20. The apparatus of claim 19, wherein the diffuser plate and the other diffuser plate are coupled to each other.

21. The apparatus of claim 20, wherein the diffuser plate is solid throughout its entirety.

22. An apparatus for filtering a fluid, the apparatus comprising:

a casing defining an interior cavity, a fluid inlet configured to direct the fluid into the interior cavity, and a fluid outlet configured to direct the fluid out of the interior cavity;

a tube sheet assembly spanning the interior cavity, the tube sheet assembly having a plurality of segments, the segments being separable from the tube sheet assembly, the segments being coplanar with each other when installed in said interior cavity and thereby defining a common retaining plate, each one of the segments defining a plurality of bores therethrough;

a plurality of filter media tubes, each filter media tube in the plurality of filter media tubes extending from a respective one of said plurality of bores, wherein the casing has a top and defines an access port that is offset from a center of the top of the casing, the access port having a central axis that is non-parallel to the filter media tubes when the filter media tubes extend from the bores, the access port having a smaller diameter than the interior cavity, each one of the segments being sized and dimensioned to be installed through the access port into the interior cavity and removed through the access port from the interior cavity, the access port being configured to provide access to the segments while the segments are installed in the interior cavity, whereby the access port and the segments facilitate reducing a dimension of a space required for installation of the apparatus.

23. The apparatus of claim 22, further comprising a restrictor plate that has a perimeter shape that is smaller than a perimeter shape of the tube sheet assembly, the restrictor plate being selectively couplable to said tube sheet assembly and adapted to simultaneously sealably obstruct multiple ones of the bores when coupled to said tube sheet assembly, the restrictor plate being accessible through the access port when installed in the tube sheet assembly and being sized and dimensioned to be installed through the access port into the interior cavity and removed through the access port from the interior cavity.

24. The apparatus of claim 23, wherein the restrictor plate is configured to be installed in the tube sheet assembly in a plurality of installation configurations, wherein each of the installation configurations causes the restrictor plate to sealably obstruct a unique number of the bores.

25. The apparatus of claim 22, further comprising a diffuser plate that spans the interior cavity and that is disposed between the filter media tubes and the inlet.

\* \* \* \* \*